No. 767,348. PATENTED AUG. 9, 1904.
B. F. KENNA.
VEHICLE TIRE.
APPLICATION FILED JAN. 26, 1904.
NO MODEL.
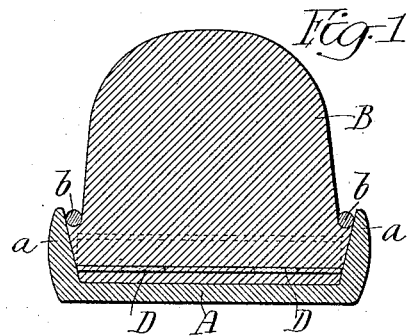
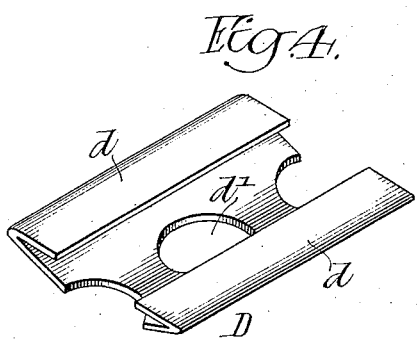
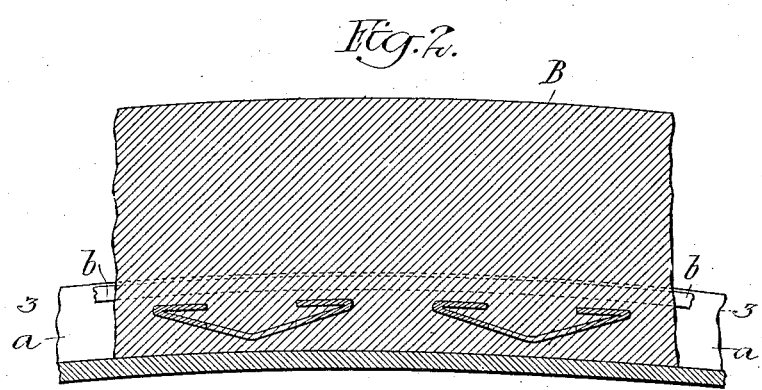
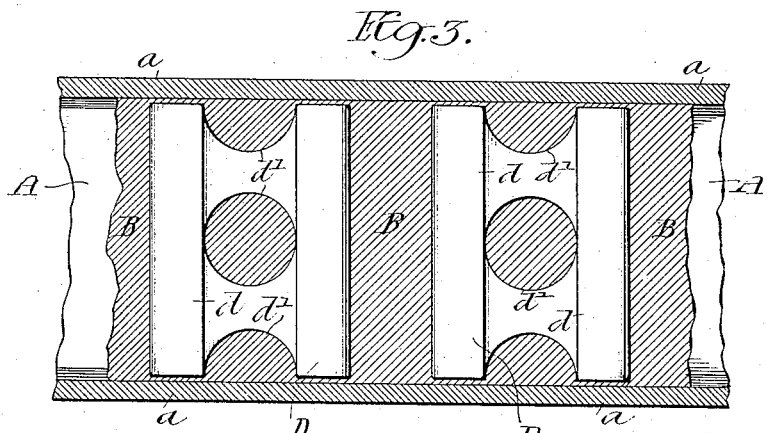
Witnesses:
Titus H. Irons.
Wesley H. Reel.
Inventor:
Benjamin F. Kenna,
by his Attorneys,
Howson & Howson No. 767,348.

Patented August 9, 1904.

UNITED STATES PATENT OFFICE.

BENJAMIN F. KENNA, OF PHILADELPHIA, PENNSYLVANIA, ASSIGNOR OF ONE-FOURTH TO WALTER IBBEKEN, OF PHILADELPHIA, PENNSYLVANIA.

VEHICLE-TIRE.

SPECIFICATION forming part of Letters Patent No. 767,348, dated August 9, 1904.

Application filed January 26, 1904. Serial No. 190,733. (No model.)

*To all whom it may concern:*

Be it known that I, BENJAMIN F. KENNA, a citizen of the United States, residing in Philadelphia, Pennsylvania, have invented certain Improvements in Vehicle-Tires, of which the following is a specification.

My invention relates to certain improvements in vehicle-tires, having for its object the provision of an improved device for retaining a rubber tire on the rim of a vehicle.

A further object of the invention is to provide an improved structure for insertion within the body of the tire which, while effectually aiding in retaining the tire in place on the rim of a wheel, shall also be of such a nature as to neither injuriously affect the wearing qualities of the tire nor unduly weaken it.

It is further desired to provide a device of the character above noted which shall be of a simple and relatively inexpensive nature. This object I attain as hereinafter set forth, reference being had to the accompanying drawings, in which—

Figure 1 is a transverse sectional elevation showing the rim of a wheel with a tire in position thereon and illustrating the application of my improvement thereto. Fig. 2 is a longitudinal sectional elevation of a tire, further illustrating the application of my improvement thereto. Fig. 3 is a sectional plan view taken on the line 3 3, Fig. 2; and Fig. 4 is a perspective view of one of the pieces employed in carrying out my invention.

In the above drawings, A represents the rim of a vehicle-wheel having around its edges upturned flanges $a$, whereby a channel or recess is formed completely around its circumference. Within this channel is placed the tire B, and in the form of my invention shown in the drawings this tire has on its inner portion laterally-projecting flanges which are engaged by wires or rings $b$, running completely around the wheel-rim, as indicated in Figs. 1 and 2.

The projecting portions of the tire are so designed that the retaining-wires $b$ extend within the channel formed by the flanges $a$ and the body of the rim A, but lie relatively near the top of said flanges. This leaves a relatively large body of the tire between the body of the rim and said wires, and within this portion of said tire are placed a series of metallic pieces of the form indicated at D. Said pieces are ordinarily made of thin sheet-steel and extend transversely of the tire, the various members of the series being separated from each other by an appreciable distance, as illustrated in Figs. 2 and 3.

As shown in Fig. 4, each of the pieces D consists of a flat strip of metal bent so that its two parts are both at an angle to the horizontal and has its edges $d$ turned inwardly until they are practically in the same plane. There are openings in the body of the piece, as indicated at $d'$, so that it will be understood that the rubber or other material of the tire does not have its strength seriously impaired by the introduction of these pieces. The latter are put in place before the tire is vulcanized, so that the rubber or other material of which said tire is composed extends through the openings $d'$ and under the turned-over edges $d$ in such manner that the pieces are effectually held in place and do not tend to cause breakage of the tire, as has often been the case heretofore when efforts have been made to introduce strengthening-pieces.

The pieces D, owing to their form, do not have a tendency to cut the rubber under the conditions to which the tire is exposed, while they effectually serve to coöperate with each other when, owing to a load on the wheel, the tire is subjected to a compressive strain. At such a time they act collectively to form a dovetail connection between the various parts of the tire and also coöperate with the wires $b$ to prevent the projecting parts of the tire from being drawn from under said wires and off of the rim.

I claim as my invention—

1. The combination of a rim, a tire thereon, and a series of pieces of material in said tire, said piece having those edges turned over which extend transversely of the tire and lie adjacent to each other, substantially as described.

2. The combination of a rim with a tire thereon and a series of pieces of sheet material in said tire, said pieces being provided with an opening or openings and having those edges which extend transversely of the tire turned over, substantially as described.

3. The combination of a rim, a tire thereon having projecting portions at its sides; wires extending around the tire and engaging said portions thereof, with a series of pieces extending transversely of the tire within the body of the same, each of said pieces consisting of a section of sheet material having openings through it and having its edges turned over, substantially as described.

4. The combination of a flanged rim and a tire thereon, means for retaining said tire in position and a series of pieces of sheet material extending transversely of the tire; the edges of said pieces which are at right angles to the length of the tire being turned over so as to lie in substantially the same plane, substantially as described.

5. As a new article of manufacture, a vehicle-tire having pieces embedded in it, each of said pieces consisting of a section of sheet material bent at substantially its middle so that one portion of it is at an angle to the other, those edges of said portions which are substantially at right angles to the length of the tire being bent toward each other, substantially as described.

6. As a new article of manufacture, a vehicle-tire, having pieces embedded in it, said pieces each consisting of a section of sheet material bent at substantially its middle so that one portion of it is at an angle to the other, the edges of said portions which are transverse to the tire being bent toward each other, there being openings in the body portion of said pieces, substantially as described.

7. As a new article of manufacture, a vehicle-tire, having embedded in it a series of pieces of sheet material, said pieces extending transversely of the tire, and each consisting of two substantially plane portions inclined to each other and having certain of its edges bent toward each other, substantially as described.

8. The combination of a rim, a tire thereon, means for retaining the tire in position upon the rim and pieces extending transversely through the tire, those edges of said pieces which extend across the tire being formed with projecting portions extending out of the plane of their respective pieces and coacting with each other to prevent displacement of the tire, substantially as described.

9. The combination of a rim with a tire thereon, means for retaining the tire in position and pieces extending transversely through the tire, said pieces being formed with those edges which lie across the tire bent at an angle to the remainder, substantially as described.

In testimony whereof I have signed my name to this specification in the presence of two subscribing witnesses.

BENJAMIN F. KENNA.

Witnesses:
WILLIAM E. BRADLEY,
JOS. H. KLEIN.